(12) United States Patent
Nomura

(10) Patent No.: US 7,369,120 B2
(45) Date of Patent: May 6, 2008

(54) INPUT POINTER AND INPUT DEVICE

(75) Inventor: Yutaka Nomura, Saitama (JP)

(73) Assignee: Wacom Co., Ltd. (JP)

( * ) Notice: Subject to any disclaimer, the term of this patent is extended or adjusted under 35 U.S.C. 154(b) by 709 days.

(21) Appl. No.: 10/874,689

(22) Filed: Jun. 24, 2004

(65) Prior Publication Data

US 2005/0017950 A1   Jan. 27, 2005

(30) Foreign Application Priority Data

Jun. 25, 2003 (JP) ............................. 2003-180581

(51) Int. Cl.
G09G 5/08 (2006.01)
(52) U.S. Cl. ...................... 345/163; 345/164; 345/165; 345/166; 345/184
(58) Field of Classification Search ................ 345/163, 345/164, 165, 166, 184
See application file for complete search history.

(56) References Cited

U.S. PATENT DOCUMENTS 6,842,169 B2 *   1/2005   Griffin et al. ............... 345/163
6,976,225 B2 *  12/2005   Ho ............................. 715/776

* cited by examiner

*Primary Examiner*—Richard Hjerpe
*Assistant Examiner*—Leonid Shapiro
(74) *Attorney, Agent, or Firm*—Berenato, White & Stavish, LLC

(57) ABSTRACT

An input pointer includes two top-surface switches and a rotary switch on the top surface of the main body, a protrusion on an imaginary center line on the bottom surface of the main body, and two bottom-surface switches at the sides of the protrusion. The two top-surface switches and the rotary switch are turned ON when pressed by a user's finger, whereas the bottom-surface switches are turned ON when the main body is tilted about the protrusion.

21 Claims, 4 Drawing Sheets

INPUT POINTER AND INPUT DEVICE

CROSS-REFERENCE TO RELATED APPLICATIONS AND CLAIM TO PRIORITY

This application claims the benefit under 35 U.S.C. § 119 of application no. 2003-180581, filed Jun. 25, 2003 in Japan, the entire disclosure of which is incorporated herein by reference.

BACKGROUND OF THE INVENTION

1. Field of the Invention

The present invention relates to input devices used as pointing devices and to input pointers for use in input devices.

2. Description of the Related Art

As computers have become more multifunctional in recent years, there is a growing need for pointing devices, functioning as computer input devices, that are capable of carrying out more functions of the computer. For example, some mice, the most widely used pointing devices, are provided with switches on the lateral surfaces of the main body, as well as on the top surface.

Many switches disposed adjacent to one another on a mouse, however, are more likely to cause the user to press an incorrect switch, which decreases the mouse operability. For this reason, there has been a demand for a mouse which is provided with many switches while still maintaining easy operability.

One possible approach for preventing the operability of a mouse from decreasing is to provide switches at sites other than the top surface and the lateral surfaces of the mouse so that the switches are not disposed close to one another. A mouse provided with a switch on the bottom surface is described in, for example, Japanese Unexamined Patent Application Publication No. 10-11211 (pages 2 to 3 and FIG. 1).

The mouse in Japanese Unexamined Patent Application Publication No. 10-11211, however, cannot have a switch disposed on the top surface of the main body due to its structure, and thus only a small number of switches are available with this mouse. More specifically, to operate the mouse in Japanese Unexamined Patent Application Publication No. 10-11211, the main body of the mouse needs to be tilted by pressing the left-front shoulder portion or the right-front shoulder portion of the mouse. The front portion of the mouse refers to the portion in contact with the user's fingertips, where switches are generally arranged. Thus, if a switch were arranged on the top surface of the main body of the mouse in Japanese Unexamined Patent Application Publication No. 10-11211, the switch on the top surface would also be pressed when the switch on the bottom surface is pressed. This means that the structure of the mouse in Japanese Unexamined Patent Application Publication No. 10-11211 does not assume that a switch is arranged on the top surface. Therefore, a method employed with the above-described mouse, that is, a method for providing switches on the bottom surface of the mouse does not achieve an object of providing a mouse with many switches while still maintaining high operability.

This is the reason there has been a growing need for pointing devices that are highly operable although provided with many switches for carrying out many functions of the computer.

SUMMARY OF THE INVENTION

In view of the above-described problem, an object of the present invention is to provide a highly operable and multifunctional pointing device.

According to an aspect of the present invention, an input pointer for pointing and inputting the coordinates or the moving direction and the amount of movement thereof in a predetermined operating area includes a main body, at least one top-surface switch on the top surface of the main body, a protrusion on an imaginary center line on the bottom surface of the main body, and at least one bottom-surface switch at a side (to the left and/or right) of the protrusion. The imaginary center line extends in the longitudinal direction, that is, in the front/back direction, of the main body.

With the above-described structure, the bottom-surface switch is operated by tilting the main body in the lateral direction, that is, perpendicular to the longitudinal direction, about the protrusion (fulcrum) on the imaginary center line. Thus, the bottom-surface switch is operated in a different manner and is subjected to force in a different direction from the top-surface switch, because the top-surface switch receives downward force when pressed by a user's finger for operation. For this reason, the user can clearly distinguish the operation between the top-surface switch and the bottom-surface switch.

This ensures that the bottom-surface switch is not mistakenly turned ON when the top-surface switch is operated or the top-surface switch is not mistakenly turned ON when the bottom-surface switch is operated. As a result, the input pointer according to the present invention can carry out a wide variety of functions with many switches while still maintaining high operability, because the switches are operated in a different manner and subjected to force in a different direction from one another, and hence the number of incorrect switch operations is minimized. Furthermore, the user is not forced to perform a particular action in a particular direction only. This lessens strain on the user fingertips.

In the input pointer, the bottom-surface switch may extend longitudinally along the imaginary center line.

With this structure, the bottom-surface switch is pressed even when the main body of the input pointer is tilted in a diagonal direction to the imaginary center line. This ensures that the bottom-surface switch is activated even when the user tilts the main body in a diagonal direction.

In the input pointer, more than one bottom-surface switch may be provided so as to extend in line on an imaginary line parallel to the imaginary center line.

With this structure, at least one of the bottom-surface switches is pressed even when the main body of the input pointer is tilted in a diagonal direction to the imaginary center line.

This ensures that the bottom-surface switch is activated even when the user tilts the main body in a diagonal direction.

In the input pointer, the protrusion may extend longitudinally along the imaginary center line.

With this structure, the main body can be tilted easily about the protrusion, and thus can be tilted reliably in the lateral direction. As a result, the bottom-surface switch can be reliably depressed with easy operation.

In the input pointer, the highest portion of the protrusion may be flat.

With this structure, since the bottom-surface switch can easily be maintained in the OFF status, the user does not have to exercise care to keep the main body horizontal to prevent the bottom-surface switch from being turned ON mistakenly.

In the input pointer, the bottom surface of the main body may have an angle of 2° or more relative to an imaginary plane passing through the protrusion and a tip of the bottom-surface switch and may have an angle of 5° or less relative to an imaginary plane passing through the protrusion and a lateral edge on the bottom surface of the main body, when the bottom-surface switch is not pressed.

With this structure, since the bottom-surface switch is not turned ON within tilting angles of 0° to 2°, incorrect operation is unlikely to occur. Furthermore, since the main body cannot be tilted beyond a tilting angle of 5°, an excessively strong compression force is not applied to the bottom-surface switch, and therefore, the bottom-surface switch is not damaged or deformed.

According to another aspect of the present invention, an input device includes one of the above-described input pointers and a detector which includes an operating area and detects the position of the input pointer in the operation area and an operation status of a switch on the input pointer.

When the input device with this structure is used in combination with a computer, the input device can carry out a wide variety of functions of the computer while still maintaining high operability.

As described above, according to the present invention, a pointing device that can carry out a wide variety of functions with many switches while still maintaining superior operability can be provided.

DESCRIPTION OF THE PREFERRED EMBODIMENTS

Preferred embodiments of the present invention will now be described with reference to the attached drawings.

Figure 1:
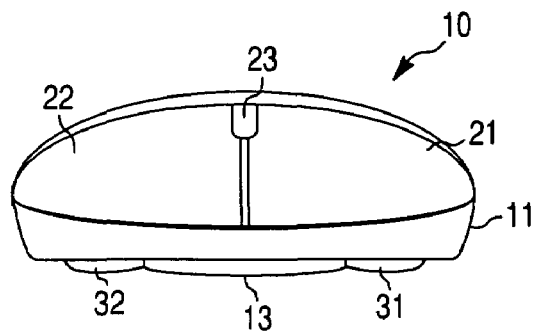
FIG. 1 is a front view of an input pointer according to an embodiment of the present invention.
Figure 2:
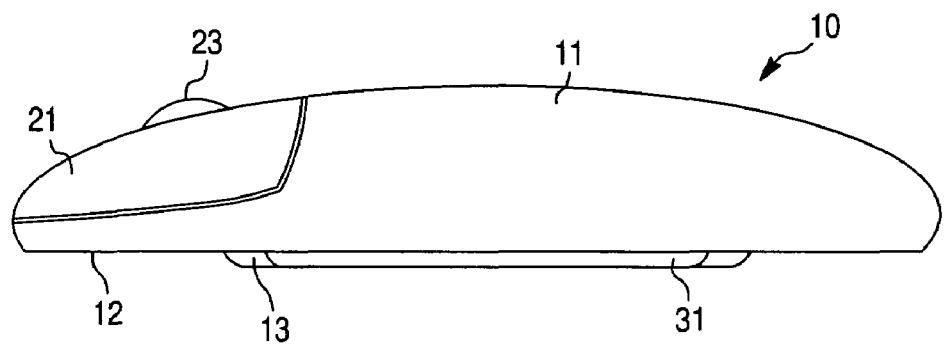
FIG. 2 is a right side view of the input pointer shown in FIG. 1.
Figure 3:
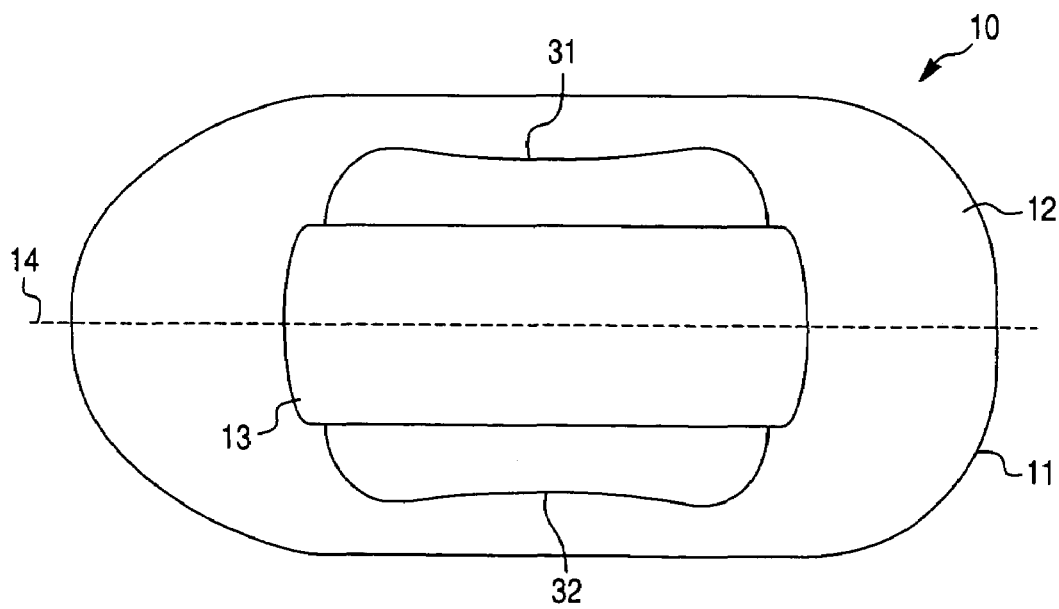
FIG. 3 is a bottom plan view of the input pointer shown in FIG. 1.

FIGS. 1 to 3 show the structure of an input pointer 10 according to an embodiment of the present invention. FIGS. 1, 2, and 3 are a front view, a right side view, and a bottom plan view, respectively, of the input pointer 10. In the following description, the surface shown in FIG. 1 is defined as the front surface of the input pointer 10. The left lateral surface of the input pointer 10 is opposed to the right lateral surface.

Referring to FIGS. 1 to 3, the input pointer 10 includes a substantially oval main body 11 including top-surface switches 21 and 22 and a rotary switch 23. The main body 11 further includes a flat bottom surface 12. On this bottom surface 12 is provided a protrusion 13. Bottom-surface switches 31 and 32 are arranged at the sides of the protrusion 13.

The top-surface switches 21 and 22 are arranged in the region from the top surface to the front surface of the main body 11. This region accommodates a user's fingertip when the input pointer 10 is operated, and the top-surface switches 21 and 22 are turned ON when they are depressed with the user's finger. The rotary switch 23 is disposed between the top-surface switches 21 and 22 near the rear ends of the top-surface switches 21 and 22. The rotary switch 23 is rotatable with respect to the main body 11, and turns ON/OFF electric current each time it is rotated by a predetermined angle.

The protrusion 13 is a raised portion with a predetermined transverse height from the bottom surface 12. The height of the protrusion 13 is the distance from the bottom surface 12 to the lowest portion of the protrusion 13 when seen in FIG. 2.

Figure 4:
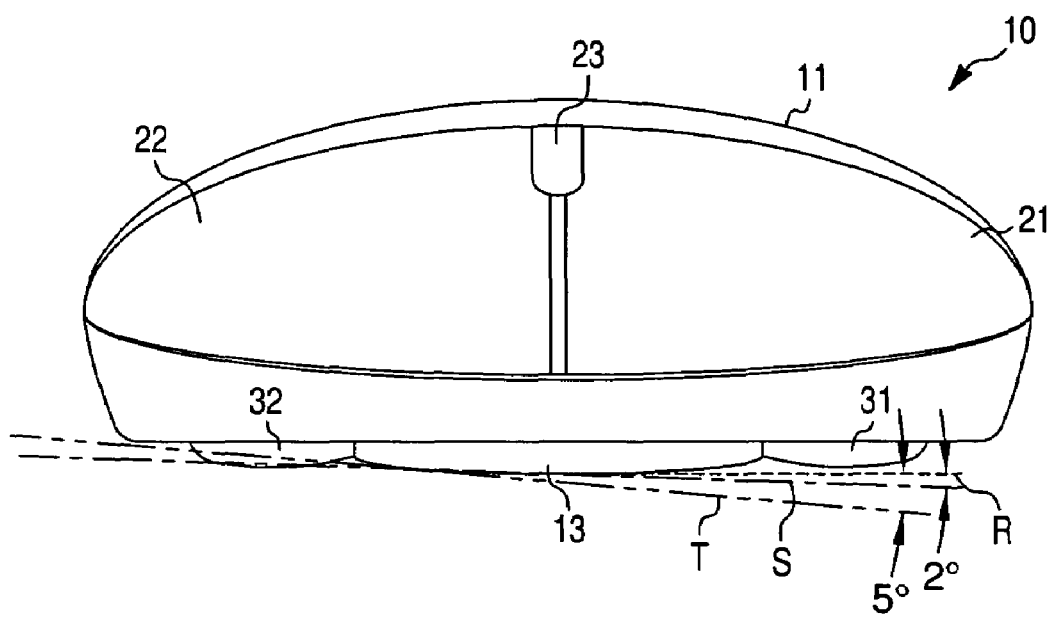
FIG. 4 is a magnified view of the view shown in FIG. 1.

The protrusion 13 is formed integrally with the bottom surface 12 or by fixing a substantially rectangular plate on the bottom surface 12. The center of the protrusion 13 is most raised and formed into a flat surface, whereas the lateral portions of the protrusion 13 are formed into curved surfaces. The highest portion of transversely projecting protrusion 13 defines a substantially flat bearing surface straddled by contoured shoulders as best seen in FIGS. 1 and 4.

An imaginary center line 14 shown in FIG. 3 extends in the longitudinal direction of the main body 11 at the center in the lateral direction on the bottom surface 12. The protrusion 13 extends along the imaginary center line 14 such that the center line on the most raised portion of the protrusion 13 is aligned with the imaginary center line 14.

Thus, when the input pointer 10 is placed on an operating or working surface, such as a desktop surface, with the top-surface switch 21 facing up and the bottom surface 12 facing down (hereinafter referred to as a ready mode), the protrusion 13 is in contact with the above-described operating or working surface. In this ready mode, the input pointer 10 is tiltable to the left and right on the protrusion 13 (as a fulcrum), that is, on the imaginary center line 14.

The bottom-surface switches 31 and 32 are substantially rectangular switches disposed symmetrically relative to the protrusion 13. They are actuated or turned ON when depressed. The bottom-surface switches 31 and 32 are arranged along the imaginary center line 14. The lengths of the bottom-surface switches 31 and 32 should not differ greatly from that of the protrusion 13.

The relationships among the heights of the protrusion 13 and the bottom-surface switches 31 and 32 will now be described with reference to FIG. 4. FIG. 4 is a magnified view of the front surface of the input pointer 10 and illustrates the radiussed or rounded contour of the surface of protrusion 13.

Referring to FIG. 4, a horizontal plane R is represented by dashed lines, an imaginary plane S defined as a plane just passing through the surfaces of the protrusion 13 and the bottom-surface switch 32 is represented by chain lines, and an imaginary plane T defined as a plane just passing through the surface of the protrusion 13 and the lateral edge of the bottom surface 12 is represented by two-dot chain lines. As described above, the bottom surface 12 of the input pointer 10 is formed flat, and therefore is parallel to the horizontal plane R in the status shown in FIG. 4.

As shown in FIG. 4, the imaginary plane S has an angle of 2° relative to the horizontal plane R. That is, the bottom-surface switch 32 is turned ON when the main body 11 is tilted by 2° or more. In other words, the bottom-surface switch 32 is OFF as long as the titling angle is less than 2°. The bottom-surface switch 31 is designed to satisfy the same condition.

On the other hand, the imaginary plane T has an angle of 5° relative to the horizontal plane R. That is, any attempt to tilt the main body 11 by more than 5° is made in vain, because the lateral edge of the bottom surface 12 comes into contact with the operating surface when a tilting angle of 5° is reached.

As described above, tilting the main body 11 less than 2° does not turn ON the bottom-surface switches 31 and 32. This range of 0° to 2° functions as a "slack". The smaller the "slack", the smaller tilting angle is sufficient to turn ON the bottom-surface switches 31 and 32. This, however, easily causes an incorrect operation. In contrast, if the "slack" is large, it is necessary to tilt the main body 11 greatly. This increases strain on the user's wrist. Therefore, it is preferable to secure a slack of 2° for the activation of the bottom-surface switches 31 and 32, as disclosed in this embodiment, to prevent the operability from degrading due to frequent incorrect operation and also to avoid excess strain on the user's wrist.

When the main body 11 is tilted by more than 2° to the right or left, the bottom-surface switch 31 or 32 is compressed against the operating surface to turn ON. When the main body 11 is titled further, the main body 11 reaches the stop point at a tilting angle of 5° as described above. At this point, even if an attempt is made to tilt the main body 11 further by applying more force to the main body 11, the compression force is not applied to the bottom-surface switch 31 or 32. This advantageously prevents the bottom-surface switches 31 and 32 from being damaged, that is, makes the bottom-surface switches 31 and 32 more durable.

Figure 5:
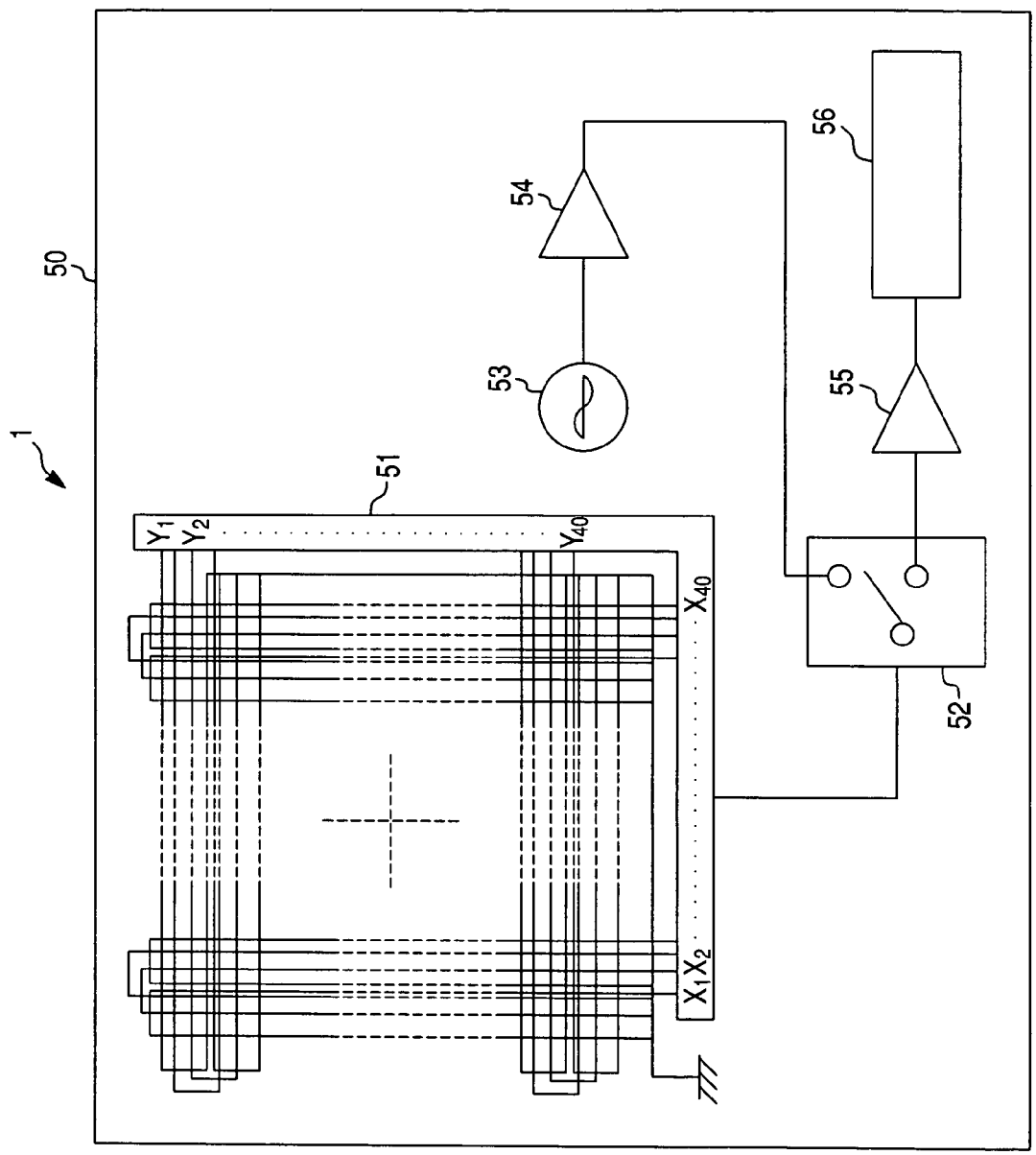
FIG. 5 is a diagram showing a circuit structure of an input device including the input pointer shown in FIG. 1.

FIG. 5 is a circuit diagram showing the structure of an input device 1 that uses the input pointer 10 shown in FIGS. 1 to 4. The input device 1 includes the input pointer 10 and a detector 50 that detects the location of the input pointer 10 and the operation status of each switch on the input pointer 10.

The detector 50 is called a tablet. The detector 50 includes a plate section of a predetermined size which has many loop coils embedded therein. This plate section is used as an operating surface (operating area) in which the input pointer 10 is moved. The detector 50 detects the position coordinates of the input pointer 10 in the plate section by using the above-described loop coils. Furthermore, the detector 50 detects the operation statuses of the switches on the input pointer 10 and produces an operation signal indicating the detected coordinates and operation statuses of the switches to output the signal to an external apparatus such as a computer (not shown in figures). Thus, the use of the detector 50 enables the input pointer 10 to point and input to, for example, a computer.

Referring to FIG. 5, the detector 50 includes 40 loop coils X1 to X40 and 40 loop coils Y1 to Y40 embedded in the above-described plate section, a selection circuit 51, a transmission/reception switching circuit 52, an oscillator 53, a transmission amplifier 54, a reception amplifier 55, and a signal-detecting circuit 56.

An X axis and a Y axis are preset in the plate section of the detector 50. The loop coils X1 to X40 extend in the X axis direction, and both ends of the loop coils X1 to X40 are connected to the selection circuit 51. Similarly, the loop coils Y1 to Y40 extend in the Y axis direction, and both ends of the loop coils Y1 to Y40 are connected to the selection circuit 51.

The selection circuit 51 selects one of the loop coils X1 to X40 and the loop coils Y1 to Y40. The transmission/reception switching circuit 52 switches between a transmission mode where a signal input from the transmission amplifier 54 is output to the selection circuit 51 and a reception mode where a signal input from the selection circuit 51 is output to the reception amplifier 55. The oscillator 53 produces a signal with a predetermined oscillation frequency and outputs it to the transmission amplifier 54. The transmission amplifier 54 amplifies the signal input from the oscillator 53 and outputs it to the transmission/reception switching circuit 52.

The reception amplifier 55 amplifies a signal input from the transmission/reception switching circuit 52 and outputs it to the signal-detecting circuit 56. The signal-detecting circuit 56 analyzes the signal input from the reception amplifier 55, detects the position of the input pointer 10 in the plate section and the operation statuses of the switches on the input pointer 10, and generates an operation signal indicating the position of the input pointer 10 and the operation statuses of the switches to output the signal to an external apparatus such as a computer (not shown in figures).

On the other hand, the input pointer 10 includes a resonant circuit 60, as shown in FIG. 5. The resonant circuit 60 includes a coil 61 and a capacitor 62 connected in parallel. The resonant circuit 60 further includes a switch 63 and a capacitor 64 connected in series to the switch 63, which is opened/closed according to the operation of the top-surface switches 21 and 22, the rotary switch 23, and the bottom-surface switches 31 and 32 shown in FIGS. 1 to 3.

The operation of the input device 1 will now be described.

First, when the loop coil X1 is selected by the selection circuit 51 and the transmission/reception switching circuit 52 of the detector 50 is switched to the transmission mode, a radio wave in accordance with the resonant frequency of the resonant circuit 60 is transmitted from the loop coil X1. "Radio wave", as used here, means an electromagnetic wave or electric wave.

In the resonant circuit 60, the capacitor 62 is charged by the radio wave transmitted from the loop coil X1.

When the transmission/reception switching circuit 52 of the detector 50 is switched to the reception mode after the transmission mode is continued for a predetermined period of time, the transmission of the radio wave from the loop coil X1 ends. In the resonant circuit 60, a radio wave is transmitted from the coil 61 as a result of the capacitor 62 discharging. The radio wave transmitted from the coil 61 is received by the loop coil X1, amplified by the reception amplifier 55, and analyzed by the signal-detecting circuit 56.

The above-described operation in the transmission mode and the reception mode is sequentially performed for all loop coils from the loop coils X1 to X40 and from the loop coils Y1 to Y40, so that the loop coil disposed closest to the resonant circuit 60 can be identified by analyzing the intensity of the signal when each loop coil receives a radio wave from the resonant circuit 60. As a result, the position coordinates of the input pointer 10 in the plate section having the embedded loop coils X1 to X40 and the loop coils Y1 to Y40 can be identified.

Furthermore, when the switch 63 is closed in the resonant circuit 60, the capacitor 62 and the capacitor 64 are connected in parallel. In this status, the capacitance of the resonant circuit 60 is equivalent to the combined capacitance of the capacitor 62 and the capacitor 64. In other words, the resonant circuit 60 includes a variable capacitor with a capacitance variable depending on the open/close status of the switch 63. A change in the capacitance in the resonant circuit 60 causes the resonant frequency in the resonant circuit 60 to change, which thereby causes the phase of a radio wave transmitted from the resonant circuit 60 to the detector 50 to change.

Thus, the detector 50 can detect the open/close status of the switch 63 by detecting a change in the phase of a radio wave according to a change in the resonant frequency in the resonant circuit 60. In other words, the detector 50 can detect the operation statuses of the top-surface switches 21 and 22, rotary switch 23, and bottom-surface switches 31 and 32 on the input pointer 10.

The detector 50 shown in FIG. 5 may be constructed so as to output an operation signal indicating the amount of movement and the movement direction of the input pointer 10 per unit of time by detecting the coordinates of the input pointer 10. Furthermore, the number of switches 63 included in the resonant circuit 60 is not limited to one. The resonant circuit 60 may include a plurality of switches corresponding to the top-surface switches 21 and 22, rotary switch 23, and bottom-surface switches 31 and 32 on the input pointer 10. In addition, the type of switch 63 or the number of contacts is not restricted.

The input device 1 with the above-described structure can use a total of five switches including the top-surface switches 21 and 22 and the rotary switch 23 on the top surface and the bottom-surface switches 31 and 32 on the bottom surface 12 of the input pointer 10. This enables the input device 1 to point and input a wide variety of functions.

The top-surface switches 21 and 22 and the rotary switch 23 are operated by the movement of the user's finger. In contrast, the bottom-surface switches 31 and 32 provided on the bottom surface 12 are operated by the turning of the user's wrist, because the bottom-surface switches 31 and 32 are actuated or turned ON by rocking or tilting the main body 11 of the input pointer 10.

Furthermore, in order to operate the bottom-surface switches 31 and 32, the main body 11 is tilted in the lateral direction, that is, perpendicular to the imaginary center line 14, about the protrusion 13 (fulcrum) provided on the imaginary center line 14. This eliminates a possibility of the top-surface switches 21 and 22 and the rotary switch 23 provided in the front of the main body 11 being operated mistakenly when the bottom-surface switches 31 and 32 are operated.

As described above, since the switches provided on the input pointer 10 are operated in a completely different manner from one another, the user can clearly distinguish the operation between the top-surface switches 21 and 22, the rotary switch 23, and the bottom-surface switches 31 and 32. This ensures that the bottom-surface switches 31 and 32 are not mistakenly turned ON when the top-surface switches 21 and 22 are operated or the top-surface switches 21 and 22 are not mistakenly turned ON when the bottom-surface switches 31 and 32 are operated. For this reason, an increase in the number of incorrect operations can be restricted, that is, superior operability can be achieved despite there being many switches. Furthermore, the user is not forced to perform a particular action in a particular direction only. This lessens strain on the user fingertips.

In addition, the protrusion 13 is elongated longitudinally along the imaginary center line 14, and hence the main body 11 does not slope in the longitudinal direction. In other words, the main body 11 can be rocked or tilted easily about the protrusion 13 (fulcrum), and thus can be tilted reliably in the lateral direction. As a result, the bottom-surface switches 31 and 32 can be reliably depressed with easy operation.

Furthermore, since the bottom-surface switches 31 and 32 are longitudinally elongated members arranged along the imaginary center line 14, they are turned ON not only when the main body 11 is tilted in the lateral direction, but also even when only part of each of the bottom-surface switches 31 and 32 is depressed as a result of the main body 11 being titled in a diagonal direction to the imaginary center line 14. Thus, the bottom-surface switches 31 and 32 are reliably turned ON even when the user operates the main body 11 in a diagonal direction to the imaginary center line 14.

In addition, since the most raised portion of the protrusion 13 is formed flat, the main body 11 can easily be maintained horizontal and is easily moved by a sliding motion across the work surface. More specifically, since the bottom-surface switches 31 and 32 can easily be maintained in the OFF status, the user does not have to pay attention to keep the main body 11 horizontal to prevent the bottom-surface switches 31 and 32 from being turned ON mistakenly. In addition, since the bottom-surface switches 31 and 32 are arranged such that a "slack" of 2° is secured, incorrect operation is more unlikely to occur.

Furthermore, since the main body 11 cannot be tilted beyond a tilting angle of 5°, an excessively strong compression force is not applied to the bottom-surface switches 31 and 32, and therefore they are not damaged or deformed, that is, they can be made more durable. For this reason, the user can use the input device 1 reliably.

In this embodiment, the input device 1 detects the position coordinates of the input pointer 10 and the operation status of each switch on the input pointer 10 by the detector 50 to output an operation signal to an external apparatus, such as a computer, from the detector 50. The present invention, however, is not limited to this structure. For example, the input device 1 may be constructed such that the input pointer 10 itself outputs an operation signal to an external apparatus.

More specifically, in an alternative embodiment, the input pointer 10 itself may be provided with a ball (not shown) which protrudes from the protrusion 13, a detection circuit which detects the rotation direction and the amount of rotation of the ball, a switch-detection circuit that detects the operation of each switch on the input pointer 10, and a control circuit that outputs the rotation direction and the amount of rotation of the ball and the operation status of each switch detected by the detection circuit and the switch-detection circuit. Furthermore, with the above-described structure, a circuit that detects the movement direction and the amount of movement of the main body 11 by illuminating the operating surface with light and then detecting the reflected light may be provided in place of the ball and the detection circuit. The movement direction and the amount of movement or the position coordinates of the input pointer 10 may also be detected by another method.

As described above, the input pointer 10 includes the top-surface switches 21 and 22 and rotary switch 23, in addition to the bottom-surface switches 31 and 32. The number of switches provided on the input pointer 10, however, can be changed.

In the embodiment shown in FIG. 1, the bottom-surface switches 31 and 32 are described to extend longitudinally along the imaginary center line 14. The present invention, however, is not limited to this structure. Instead, for example, a plurality of round switches may be used. Another embodiment where a plurality of round switches is used will now be described with reference to FIG. 6.

Figure 6:
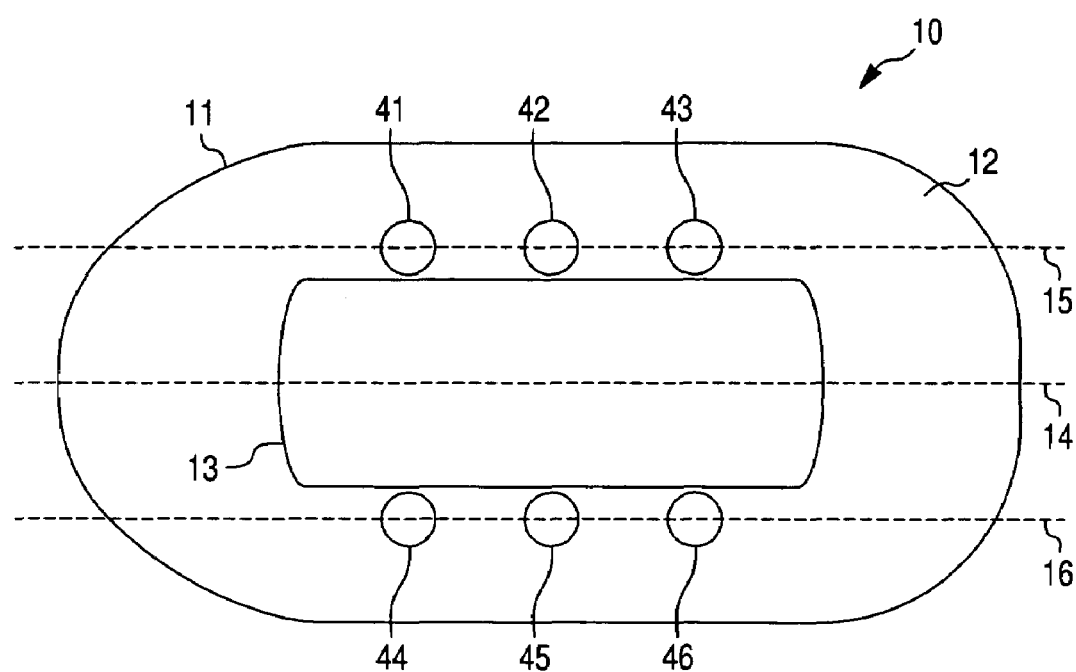
FIG. 6 is a bottom plan view of an input pointer according to another embodiment of the present invention.

In the embodiment shown in FIG. 6, the input pointer 10 includes bottom-surface round switches 41, 42, and 43 and bottom-surface round switches 44, 45, and 46 in place of the bottom-surface switches 31 and 32.

The bottom-surface switches 41, 42, and 43 are arranged in line on an imaginary line 15 parallel to the imaginary center line 14. The bottom-surface switches 41, 42, and 43 are actuated or turned ON when they are pressed. Similarly, the bottom-surface switches 44, 45, and 46 are arranged in line on an imaginary line 16 parallel to the imaginary center line 14, and are actuated or turned ON when they are pressed.

The heights of the bottom-surface switches 41, 42, and 43 are the same as that of the bottom-surface switch 31. In other words, an imaginary plane passing through the surface of the protrusion 13 and the surfaces of the bottom-surface switches 41, 42, and 43 has an angle of 2° relative to the bottom surface 12. The same condition applies to the bottom-surface switches 44, 45, and 46. That is, an imaginary plane passing through the surface of the protrusion 13 and the surfaces of the bottom-surface switches 44, 45, and 46 has an angle of 2° relative to the bottom surface 12.

As described above, the input pointer 10 provided with the bottom-surface switches 41, 42, and 43 in place of the bottom-surface switch 31 can offer the same advantages as in the embodiment shown in FIG. 1 by outputting, when at least one of the bottom-surface switches 41, 42, and 43 is turned ON, the same signal as that output when the bottom-surface switch 31 is turned ON.

The main body 11 of the input pointer 10 is not necessarily tilted right about the imaginary center line 14. For example, it may be tilted in a diagonal direction to the imaginary center line 14. For this reason, in the embodiment shown in FIG. 1, the bottom-surface switches 31 and 32 are formed to extend longitudinally so as to be responsive even when the main body 11 is tilted in a diagonal direction.

In the embodiment shown in FIG. 6, however, not all the bottom-surface switches 41, 42, and 43 may be depressed when the main body 11 is tilted in a diagonal direction. To overcome this problem, a structure such that a response is made when any of the bottom-surface switches 41, 42, and 43 is pressed is employed to ensure that any one or two of the three switches being turned ON brings about the same effect as when all three switches are turned ON. Thus, even when the bottom-surface round switches 41, 42, and 43 are used, the same advantages as when the longitudinally elongated bottom-surface switch 31 is used can be offered by employing the above-described structure that ensures a predetermined response is made when at least one of the three switches is pressed.

Similarly, the same advantages as when the bottom-surface switch 32 is used can be offered by employing a structure where the same response is made when at least one of the bottom-surface switches 44, 45, and 46 is pressed.

In the embodiment shown in FIG. 6, a total of six switches including the bottom-surface switches 41, 42, and 43 and the bottom-surface switches 44, 45, and 46 are used. However, the number of bottom-surface switches that can be used is not restricted.

According to the present invention, detailed structures of the input device 1, including the points described above, are not limited to those described in the embodiments, but various modifications are conceivable within the scope of the present invention.

What is claimed is:

1. An input pointer for pointing and inputting the coordinates or the moving direction and the amount of movement thereof in a predetermined operating area, comprising:
   a main body;
   at least one top-surface switch on a top surface of the main body;
   a protrusion on an imaginary center line on a bottom surface of the main body, the imaginary center line extending in the longitudinal direction; and
   at least one bottom-surface switch at a side of the protrusion.

2. The input pointer of claim 1, wherein the bottom-surface switch extends longitudinally along the imaginary center line.

3. The input pointer of claim 1, wherein said at least one bottom-surface switch comprises a plurality of bottom-surface switches extending in line on an imaginary line parallel to the imaginary center line.

4. The input pointer of claim 1, wherein the protrusion extends longitudinally along the imaginary center line.

5. The input pointer of claim 1, wherein a highest portion of the protrusion is flat.

6. The input pointer of claim 1, wherein the bottom surface of the main body has an angle of 2° or more relative to an imaginary plane passing through the protrusion and a tip of the bottom-surface switch and has an angle of 5° or less relative to an imaginary plane passing through the protrusion and a lateral edge on the bottom surface of the main body, when the bottom-surface switch is not pressed.

7. An input device comprising:
   the input pointer of claim 1; and
   a detector which includes an operating area and detects the position of the input pointer in the operation area and an operation status of a switch on the input pointer.

8. The input pointer of claim 1, wherein said at least one top-surface switch is disposed on a top outer surface of the main body, said protrusion is disposed on a bottom outer surface of the main body, and said at least one bottom-surface switch is disposed on said bottom outer surface of said main body adjacent to said protrusion.

9. A method for operating an input device, comprising the method steps of:
   (a) providing a main body having at least one top-surface switch on a top surface of the main body, a protrusion on an imaginary center line on a bottom surface of the main body and at least a first bottom-surface switch at a first side of the protrusion;
   (b) grasping said main body with the hand proximate said top surface such that a part of the hand is disposed on one side of said imaginary center line and another part of the hand is on an opposing side of said center line;
   (c) tilting or rocking said main body about said imaginary center line to bring said bottom surface switch into contact with a work surface; and
   (d) actuating said bottom surface switch against said work surface.

10. The method for operating an input device of claim 9, further comprising the method steps of:
   (e) providing, on said main body, a second bottom-surface switch at an opposing side of said protrusion from said first switch;
   (f) tilting or rocking said main body about said imaginary center line to bring said second bottom surface switch into contact with said work surface; and
   (g) actuating said second bottom surface switch against said work surface.

11. The method for operating an input device of claim 9, wherein said method step (c), tilting or rocking said main body about said imaginary center line to bring said bottom surface switch into contact with a work surface, comprises:
   (c1)
   rocking said main body about a fulcrum defined by said work surface bearing against said protrusion.

12. The method for operating an input device of claim 11, further comprising:
   (e) sliding said protrusion across said work surface to a selected position, and (f) actuating said bottom surface switch against said work surface at said selected position.

13. The method for operating an input device of claim 9, wherein said work surface comprises a digitizer configured to detect the position of the input device, said method further comprising:

(d) sensing, in said digitizer, said actuation of said bottom surface switch against said work surface; and (e) sensing, in said digitizer, said location of said input device upon said work surface.

14. A computer input device, comprising:

an electronic tablet or detector having a work surface;

an input pointer, at least one signal being transmitted and received between said input pointer and said tablet, and a position designated with said input pointer being detected;

a tuning circuit provided in said input pointer;

an electric wave generating circuit for sending an electric wave to said tuning circuit, said tuning circuit resonating with the electric wave from said electric wave generating circuit to generate another electric wave to be sent to an electric wave detecting means; wherein coordinates values corresponding to said position designated with said input pointer on said tablet are detected via said electric wave detecting means; and said input pointer having a main body having at least one top-surface switch on a top surface of the main body, a protrusion on an imaginary center line on a bottom surface of the main body and at least a first bottom-surface switch at a first side of the protrusion.

15. The input device of claim 14, wherein the bottom-surface switch extends longitudinally along the imaginary center line.

16. The input device of claim 14, wherein said at least one bottom-surface switch comprises a plurality of bottom-surface switches extending in line on an imaginary line parallel to the imaginary center line.

17. The input device of claim 14, wherein said at least one bottom-surface switch comprises a first bottom-surface switch on a first side of said imaginary center line and a second bottom-surface switch on a second side proximate said imaginary center line and opposite said first side.

18. The input device of claim 14, wherein the protrusion extends longitudinally along the imaginary center line.

19. The input device of claim 14, wherein a highest portion of the protrusion defines a substantially flat bearing surface.

20. The input device of claim 19, wherein the bottom surface of the main body has an angle in the range of 2° to 5° relative to an imaginary plane tangent to said protrusion bearing surface and a tip of the bottom-surface switch, when the bottom-surface switch is not pressed against said tablet work surface.

21. The input device of claim 20, wherein the bottom surface of the main body has an angle of 5° or less relative to an imaginary plane tangent to said protrusion bearing surface and a lateral edge on the bottom surface of the main body.

* * * * *